United States Patent
Yamazaki et al.

(10) Patent No.: US 10,419,127 B2
(45) Date of Patent: Sep. 17, 2019

(54) PHASE COMPENSATION DEVICE, PHASE COMPENSATION METHOD AND COMMUNICATION APPARATUS

(71) Applicants: NTT ELECTRONICS CORPORATION, Yokohama-shi, Kanagawa (JP); NIPPON TELEGRAPH AND TELEPHONE CORPORATION, Chiyoda-ku, Tokyo (JP)

(72) Inventors: Etsushi Yamazaki, Kanagawa (JP); Hiroyukl Nouchi, Kanagawa (JP); Yasuharu Onuma, Kanagawa (JP); Tomohiro Takamuku, Kanagawa (JP); Katsuichi Oyama, Kanagawa (JP); Kazuhito Takei, Kanagawa (JP); Masahito Tomizawa, Tokyo (JP); Yoshiaki Kisaka, Tokyo (JP); Mltsuteru Yoshida, Tokyo (JP); Masanori Nakamura, Tokyo (JP)

(73) Assignees: NTT ELECTRONICS CORPORATION, Yokohama-shi, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/072,420

(22) PCT Filed: Apr. 13, 2017

(86) PCT No.: PCT/JP2017/015195
§ 371 (c)(1),
(2) Date: Nov. 1, 2018

(87) PCT Pub. No.: WO2017/217100
PCT Pub. Date: Dec. 21, 2017

(65) Prior Publication Data
US 2019/0074909 A1    Mar. 7, 2019

(30) Foreign Application Priority Data

Jun. 17, 2016  (JP) .................................. 2016-120841

(51) Int. Cl.
H04B 10/61    (2013.01)
H04L 27/01    (2006.01)
H04L 27/38    (2006.01)

(52) U.S. Cl.
CPC ......... H04B 10/6164 (2013.01); H04B 10/61 (2013.01); H04B 10/615 (2013.01);
(Continued)

(58) Field of Classification Search
CPC .................................................. H04B 10/6165
See application file for complete search history.

(56) References Cited

U.S. PATENT DOCUMENTS

2009/0245403 A1   10/2009   Zhang
2014/0270810 A1    9/2014   Nakashima
(Continued)

FOREIGN PATENT DOCUMENTS

JP    2014-155194 A    8/2014
JP    2014-175991 A    9/2014
JP    2015-76727 A     4/2015

OTHER PUBLICATIONS

International Preliminary Report on Patentability with Written Opinion of the International Searching Authority issued for corresponding International Patent Application No. PCT/JP2017/015195 dated Dec. 18, 2018.

(Continued)

*Primary Examiner* — Shi K Li
(74) *Attorney, Agent, or Firm* — Myers Wolin, LLC

(57) ABSTRACT

A symbol phase difference compensating portion (6) calculates a first phase difference which is a phase difference between a known pattern extracted from a received signal (Continued)

and a true value of the known pattern and performs phase compensation for the received signal based on the first phase difference. A tentative determination portion (12) tentatively determines an output signal of the symbol phase difference compensating portion (6) to acquire an estimated value of a phase. A first phase difference acquiring portion (13) acquires a second phase difference which is a phase difference between a phase of the output signal and the estimated value of the phase acquired by the tentative determination portion (12). A first phase difference compensating portion (14) performs phase compensation for the output signal based on the second phase difference.

8 Claims, 7 Drawing Sheets

(52) U.S. Cl.
CPC ......... *H04B 10/6165* (2013.01); *H04L 27/01* (2013.01); *H04L 27/38* (2013.01)

(56) References Cited

U.S. PATENT DOCUMENTS

2015/0098714 A1* 4/2015 Hatae ................. H04B 10/6164
398/208
2015/0372766 A1* 12/2015 Yoshida ............. H04B 10/2507
398/193

OTHER PUBLICATIONS

Extended European Search Report including the supplementary European search report and European search opinion issued for corresponding European Patent Application No. 17813006.8, (PCT/JP2017015195) dated Jul. 29, 2019.

* cited by examiner

PHASE COMPENSATION DEVICE, PHASE COMPENSATION METHOD AND COMMUNICATION APPARATUS

CROSS-REFERENCE TO RELATED APPLICATIONS

This application is a National Stage entry of International Application No. PCT/JP2017/015195, filed on Apr. 13, 2017, which claims priority to Japanese Patent Application No. 2016-120841, filed on Jun. 17, 2016. The disclosures of priority applications are incorporated in their entirety herein by reference.

FIELD

The present invention relates to a phase compensation device for compensating phase fluctuation in data communication, a phase compensation method and a communication apparatus.

BACKGROUND

In coherent optical communication, a frequency offset (a frequency error), which is a frequency difference, occurs between a frequency of a received signal and a frequency of a local oscillation light source. Further, due to a nonlinear optical effect, vibration of an optical fiber and the like, a phase fluctuation such as phase noise occurs in the received signal.

To cope with this, a technique of, after raising an input signal to the power of N to remove a phase term (a phase change due to modulation), detecting a frequency error and feeding back the frequency error to an input side to compensate a frequency offset is proposed (see, for example, PTL 1). However, though the frequency offset can be compensated to some extent, a lot of phase noise still remains.

Further, a technique of tentatively determining a received signal based on a threshold set according to an amplitude and compensating a difference between an original phase and a phase of the received signal is proposed (see, for example PTL 2). However, since accuracy of phase noise compensation is low only by tentative determination, the accuracy is increased by feeding back a frequency error and a phase error detected during calculation to reduce a phase fluctuation before the tentative determination.

Further, a technique of extracting a known pattern inserted on a transmission side from a received signal and detecting a difference between an original phase and a phase of the received signal to compensate phase noise is proposed (see, for example, PTL 3).

CITATION LIST

Patent Literature

[PTL 1] JP 2015-76727 A
[PTL 2] JP 2014-175991 A
[PTL 3] JP 2014-155194 A

SUMMARY

Technical Problem

However, there is a problem that, even if phase noise compensation is performed by a conventional technique, a phase fluctuation cannot be sufficiently removed and left. Further, since a feedback configuration requires high-speed frequency/phase control performance, realization is difficult.

The present invention has been made to solve the problems as described above, and an object of the invention is to obtain a phase compensation device capable of improving accuracy of phase fluctuation compensation without using a feedback configuration, a phase compensation method and a communication apparatus.

Solution to Problem

A phase compensation device according to the present invention includes: a symbol phase difference compensating portion calculating a first phase difference which is a phase difference between a known pattern extracted from a received signal and a true value of the known pattern and performing phase compensation for the received signal based on the first phase difference; a tentative determination portion tentatively determining an output signal of the symbol phase difference compensating portion to acquire an estimated value of a phase; a first phase difference acquiring portion acquiring a second phase difference which is a phase difference between a phase of the output signal and the estimated value of the phase acquired by the tentative determination portion; and a first phase difference compensating portion performing phase compensation for the output signal based on the second phase difference.

Advantageous Effects of Invention

The present invention makes it possible to improve accuracy of phase fluctuation compensation without using a feedback configuration.

DESCRIPTION OF EMBODIMENTS

A phase compensation device, a phase compensation method and a communication apparatus according to the embodiments of the present invention will be described with reference to the drawings. The same components will be denoted by the same symbols, and the repeated description thereof may be omitted.

First Embodiment

Figure 1:
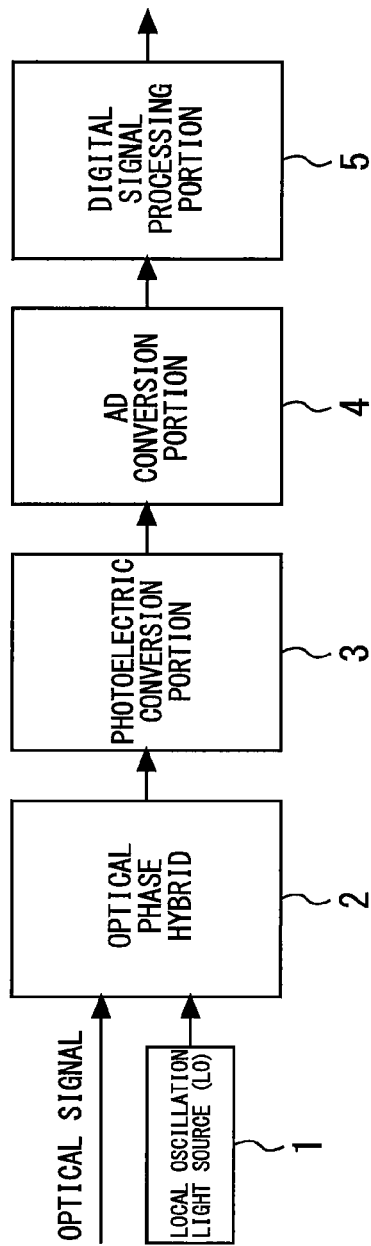
FIG. 1 is a diagram showing a communication apparatus according to a first embodiment of the present invention.

FIG. 1 is a diagram showing a communication apparatus according to a first embodiment of the present invention. This communication apparatus is a digital coherent optical receiver which receives an optical signal transmitted from a transmission side.

A local oscillation light source 1 (a local oscillator) is a light source which oscillates laser light with the same frequency as an optical signal. Due to an individual difference of the local oscillation light source 1, however, a frequency difference exists between a frequency of an optical signal and a frequency of output light of the local oscillation light source 1.

An optical phase hybrid 2 mixes an optical signal and local light outputted from the local oscillation light source 1 to generate a pair of optical signals which are orthogonal to each other. One of the paired optical signals is obtained by combining the optical signal and the local light and is called an I (In-phase) component optical signal. The other of the paired optical signals is obtained by combining the optical signal and laser light obtained by rotating a phase of the local light by 90 degrees and is called a Q (Quadraturephase, orthogonal) component optical signal.

A photoelectric conversion portion 3 converts the pair of optical signals to a pair of analog electrical signals. That is, the photoelectric conversion portion 3 converts the I-component optical signal and the Q-component optical signal to an I-component electrical signal and a Q-component electrical signal.

An AD (Analog to Digital) conversion portion 4 converts the pair of analog electrical signals to a pair of digital electrical signals by sampling the pair of analog electrical signals at a predetermined sampling frequency. That is, the AD conversion portion 4 converts the I-component analog electrical signal and the Q-component analog electrical signal to an I-component digital electrical signal and a Q-component digital electrical signal.

A digital signal processing portion 5 restores (demodulates) transmit data by performing digital signal processing for the digital electrical signals outputted from the AD conversion portion 4. The digital signal processing portion 5 has a phase compensation device described below.

Figure 2:
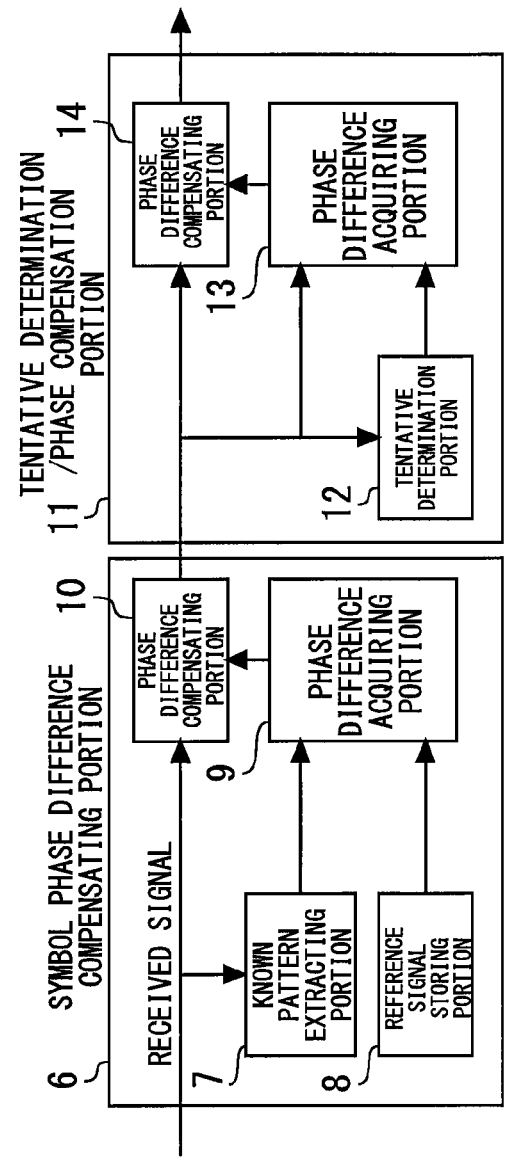
FIG. 2 is a diagram showing a phase compensation device according to the first embodiment of the present invention.

FIG. 2 is a diagram showing a phase compensation device according to the first embodiment of the present invention. For an optical signal, a known pattern is inserted into a data signal at predetermined intervals on a transmission side. As for this, there is a characteristic that one or more symbols are inserted in a relatively short cycle. However, the one or more symbols are simultaneously inserted at the same time into a plurality of data strings (physical lanes) which are simultaneously transmitted. For example, for dozens of symbols, one symbol is inserted. Hereinafter, this will be referred to as a "short-cycle/short known pattern". Therefore, the short-cycle/short known pattern is inserted into a received signal which is a digital electrical signal corresponding to an optical signal. A symbol phase difference compensating portion 6 calculates a first phase difference which is a phase difference between a short-cycle/short known pattern extracted from a received signal and a true value thereof and performs phase compensation for the received signal based on the first phase difference.

In the symbol phase difference compensating portion 6, a known pattern extracting portion 7 extracts a short-cycle/short known pattern inserted in a received signal. A true value of the short-cycle/short known pattern inserted into a data signal on a transmission side is stored in a reference signal storing portion 8 as a reference signal in advance. The phase of the reference signal indicates the phase which the short-cycle/short known pattern should originally take. A phase difference acquiring portion 9 acquires a first phase difference which is a phase difference between the short-cycle/short known pattern extracted by the known pattern extracting portion 7 and the reference signal. A phase difference compensating portion 10 performs phase compensation for the received signal based on the first phase difference. For example, phase rotation corresponding to the first phase difference is performed for the received signal. The phase compensation is not limited thereto. Calculation of electric field information may be performed to compensate the first phase difference by multiplication of an electric field vector.

An output signal of the symbol phase difference compensating portion 6 is inputted to a tentative determination/phase compensation portion 11. In the tentative determination/phase compensation portion 11, a tentative determination portion 12 tentatively determines the output signal of the symbol phase difference compensating portion 6 to acquire an estimated value of a phase (a phase which originally should be taken). A phase difference acquiring portion 13 acquires a second phase difference which is a phase difference between a phase of the output signal of the symbol phase difference compensating portion 6 and the estimated value of the phase acquired by the tentative determination portion 12. A phase difference compensating portion 14 performs phase compensation for the output signal of the symbol phase difference compensating portion 6 based on the second phase difference.

As described above, in the present embodiment, since the tentative determination/phase compensation portion 11 is arranged at a subsequent stage of the symbol phase difference compensating portion 6, phase noise which cannot be sufficiently compensated by the symbol phase difference compensating portion 6 can be removed by the tentative determination/phase compensation portion 11. Each of the symbol phase difference compensating portion 6 and the tentative determination/phase compensation portion 11 has a simple feed-forward configuration. Furthermore, since most of phase noise is removed by the symbol phase difference compensating portion 6, it is not necessary to feed back a phase error before tentative determination. Therefore, it is possible to improve accuracy of phase fluctuation compensation without using a complicated feedback configuration.

Second Embodiment

Figure 3:
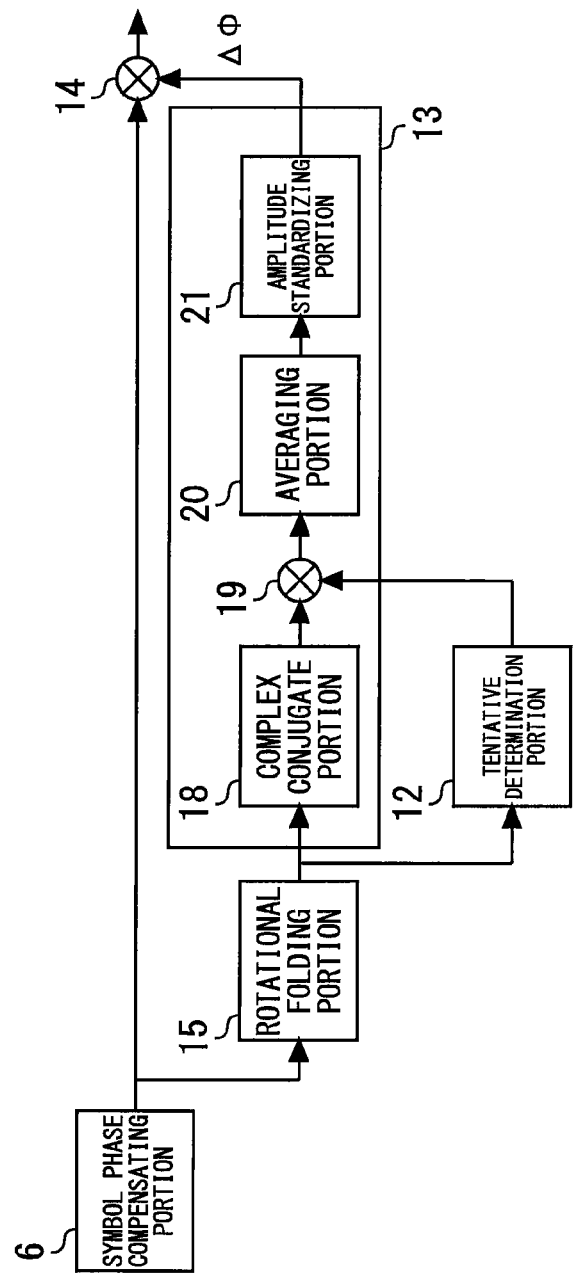
FIG. 3 is a diagram showing a phase compensation device according to a second embodiment of the present invention.
Figure 4:
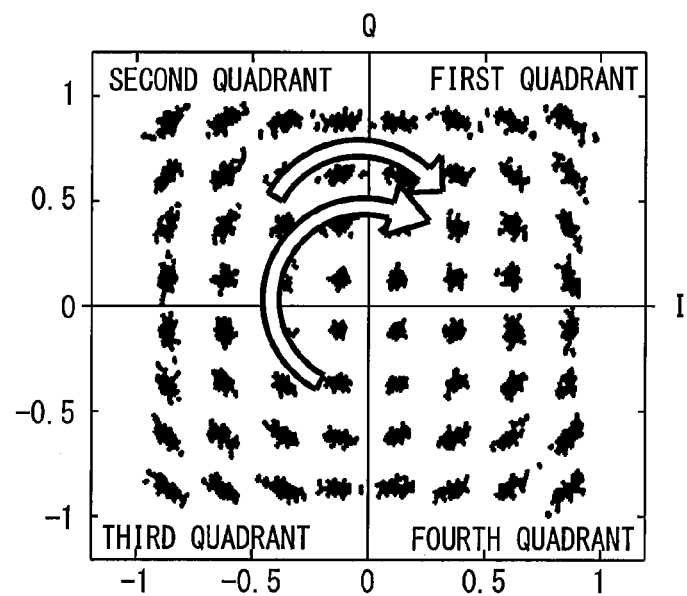
FIG. 4 is a diagram in which output signals of the symbol phase difference compensating portion are plotted on a constellation.

FIG. 3 is a diagram showing a phase compensation device according to a second embodiment of the present invention. FIG. 4 is a diagram in which output signals of the symbol phase difference compensating portion are plotted on a constellation. The constellation is also called a signal space diagram, and it is a diagram in which a digital modulation signal is expressed on a complex plane.

For the output signals of the symbol phase difference compensating portion 6, a rotational folding portion 15 folds the signals in all quadrants into the first quadrants. That is, signals existing in the first quadrant are left as they are; signals existing in the second quadrant are folded into the first quadrant by being rotated $-\pi/2$ times; signals existing in the third quadrant are folded into the first quadrant by being rotated $-\pi$ times; and signals existing in the fourth quadrant are folded into the first quadrant by being rotated $+\pi/2$ ($=-\pi/2$) times. Then, the tentative determination portion 12 and the phase difference acquiring portion 13 perform processing for the output signals folded by the rotational folding portion 15. Thereby, a circuit scale can be reduced. Though folding into the first quadrant has been shown in the present example, folding is not limited thereto. A similar effect can be obtained by rotating and folding signals existing in other quadrants into any one of the first to fourth quadrants.

The tentative determination portion 12 sets an estimated value of a phase for each of a plurality of threshold regions on the constellation, and determines estimated values of phases corresponding to threshold regions in which the output signals of the symbol phase difference compensating portion 6 are included.

Figure 5:
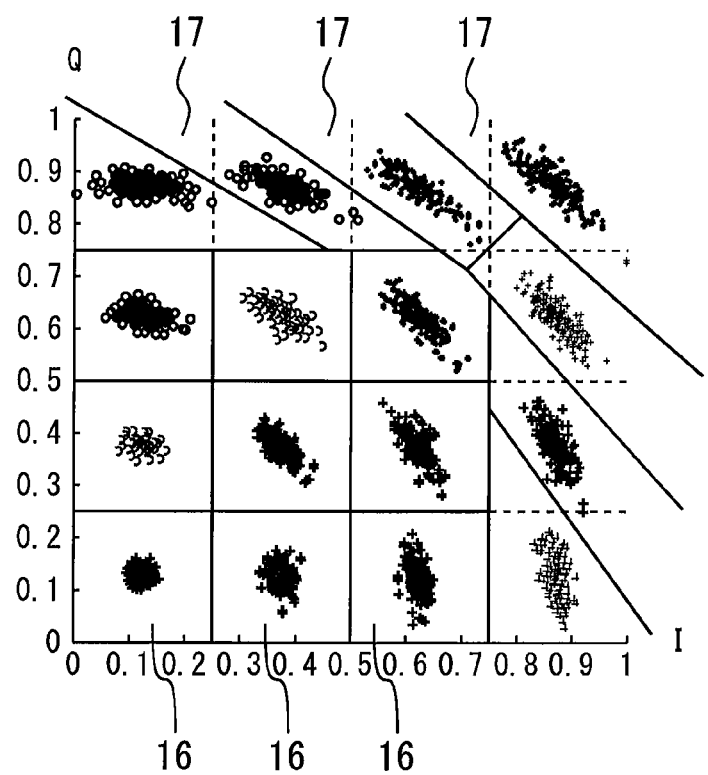
FIG. 5 is a diagram showing a plurality of threshold regions set by the tentative determination portion according to the second embodiment of the present invention.
Figure 6:
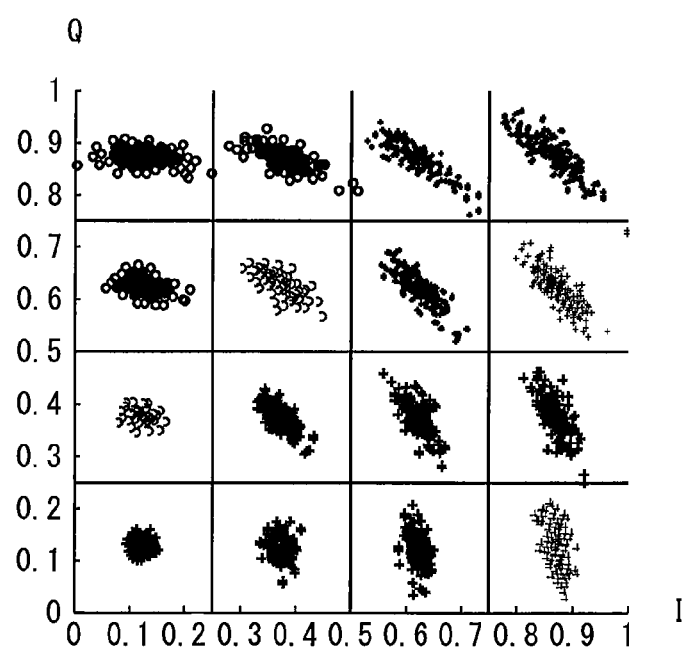
FIG. 6 is a diagram showing a plurality of threshold regions set by a tentative determination portion according to a comparison example.

FIG. 5 is a diagram showing a plurality of threshold regions set by the tentative determination portion according to the second embodiment of the present invention. FIG. 6 is a diagram showing a plurality of threshold regions set by a tentative determination portion according to a comparison example. In the comparison example, all the plurality of threshold regions are in the same square shape and arranged in a checkerboard pattern. In comparison, in the present embodiment, the plurality of threshold regions include a first threshold region 16 and a second threshold region 17 corresponding to signals whose amplitude is larger than that of signals to which the first threshold region 16 corresponds. Similarly to the comparison example, the first threshold region 16 is in the same square shape and arranged in a checkerboard pattern. On the other hand, the second threshold region 17 extends in a phase rotation direction in comparison with the first threshold region 16. Since output signals of the symbol phase difference compensating portion 6 are spread and distributed in the phase rotation direction as the amplitude increases, it is possible to reduce error determination by setting threshold regions as in the present embodiment. Therefore, it becomes difficult to perform wrong phase compensation, and it is possible to reduce a phase compensation error.

In the phase difference acquiring portion 13, a complex conjugate portion 18 calculates complex conjugates of signals folded into the first quadrant. By a multiplication portion 19 multiplying the complex conjugates by a signal outputted by the tentative determination portion 12, a complex signal of electric field information having phase differences among the signals is calculated. Then, after an averaging portion 20 determines an average for several symbols, an amplitude standardizing portion 21 standardizes amplitudes to 1. This is for the purpose of preventing amplitudes of the output signals of the symbol phase difference compensating portion 6 from being influenced in the phase difference compensating portion 14.

The phase difference compensating portion 14 multiplies the output signals of the symbol phase difference compensating portion 6 by the standardized complex signal. Thereby, for the output signals on which remaining phase noise exists, phase fluctuation can be compensated.

As the averaging by the averaging portion 20, a method of determining a moving average for every several symbols or a block averaging method of determining an average for each block can be used. Further, such a method can be also used that block averaging in which a moving average is determined for every half of a block and an interpolation function are combined.

Since the number of threshold determination conditions can be reduced to ¼ by performing folding into the first quadrant by rotational folding, there is a merit that a circuit scale can be reduced. The rotational folding portion 15, however, can be omitted. In this case, by setting tentative determination thresholds for all the quadrants to perform tentative determination, estimated phase values are obtained. By individually setting a tentative determination threshold for each quadrant, it becomes possible to optimize the tentative determination threshold for each quadrant if there is particular distortion on an IQ plane, and performance may be improved. An optimal tentative determination threshold changes due to the multi-valued degree of a modulation method, an amount of white noise, an amount of phase noise and the like. Therefore, by adopting a circuit configuration capable of setting and changing a tentative determination threshold, it becomes possible to select an optimal tentative determination threshold, reduce a phase estimation error and improve performance. Further, by adopting a circuit configuration capable of setting and changing a tentative determination threshold and, furthermore, capable of setting and changing an ideal IQ mapping position on a transmission side outputted from the tentative determination portion, it becomes possible to estimate carrier phases of different modulation method in the same circuit configuration. In threshold determination, the determination can be performed by indicating a threshold by a threshold line on I and Q axes.

Figure 7:
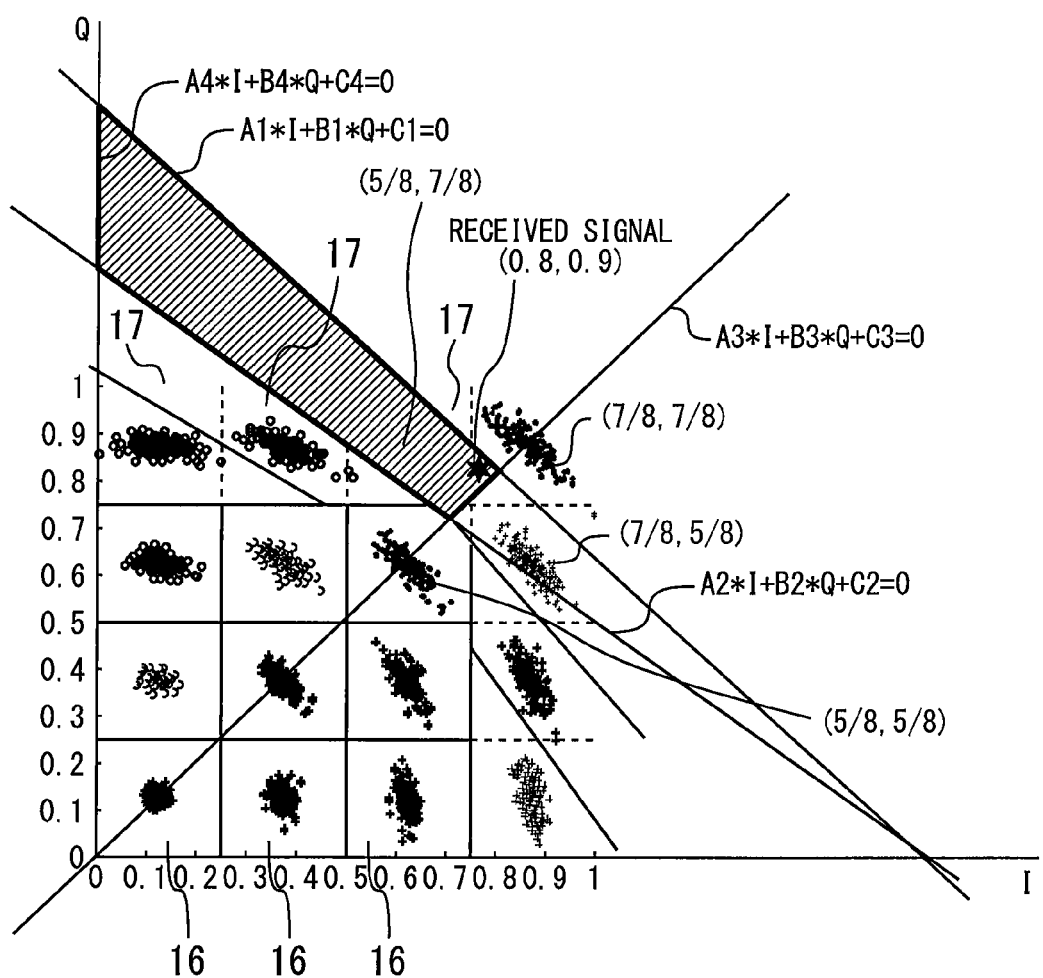
FIG. 7 is a diagram illustrating determination by threshold lines.

FIG. 7 is a diagram illustrating determination by threshold lines. Each determination region corresponds to a constellation of 64 points corresponding to mapping of a transmission side. This figure shows determination regions in the first quadrant and shows determination regions of constellations of coordinates with I=⅛, ⅜, ⅝, ⅞ and Q=⅛, ⅜, ⅝, ⅞. For example, consideration will be made on a case where (I, Q)=(0.8, 0.9) is received as a received signal. In this case, it is checked first whether the received signal is included in a determination region of the constellation (⅝, ⅞). A threshold line in this case is indicated by 0=An*I+Bn*Q+Cn (n=1 to 4). By transforming this equation, Q=−An/Bn*I−Cn/Bn is obtained, which indicates a straight line on the IQ plane. Especially, it can indicates a straight line parallel to the Q axis when Bn=0 is set, and it can indicates a straight line parallel to the I axis when An=0 is set. By inputting a received I value into the above equation and comparing a Q value obtained by inputting the I value and a Q value actually received, it can be easily determined on which side of the threshold line a received signal exists. Variables An, Bn and Cn of the threshold line can be easily determined by setting passing points and inclination. For example, in the case of a threshold line of n=1, A1=1, B1=1 and C1=−15/8 can be set; A1*0.8+B1*0.9+C1=−0.175<0 is obtained; and it is shown that the received signal is below this threshold line. In the case of a threshold line of n=2, A2=5/12, B2=7/12 and C2=−5/12(⅜+⅝)/2−7/12(⅞+⅞)/2 are set; A2*0.8+B2*0.9+C2=0.139583>0 is obtained; and it is shown that the received signal is above this threshold line. Here, the coefficient C2 for the above threshold line is set to be an intermediate point between (⅜, ⅞) and (⅝, ⅞) as a passing point. Furthermore, in the case of a threshold line of n=3, A3=−1, B3=1 and C3=0 are set; A3*0.8+B3*0.9+C3=0.1>0 is obtained; and it is shown that the received signal is above this threshold line. In the case of a threshold line of n=4, A4=1, B4=0 and C4=0 are set; 1=0.8>0 is obtained; and it is shown that the received signal is on a positive side of this threshold line.

From the above, it can be determined that the received signal (0.8, 0.9) exists in the determination region of the constellation (⅝, ⅞) and is data corresponding to (⅝, ⅞). Though a case where the threshold lines are straight lines is shown above, it goes without saying that the threshold lines can be indicated by quadratic curves. It is also possible to make the above variables A and B changeable. Furthermore, if the variables A and B can be set from outside, it is possible to change a threshold according to a reception situation.

Third Embodiment

Figure 8:
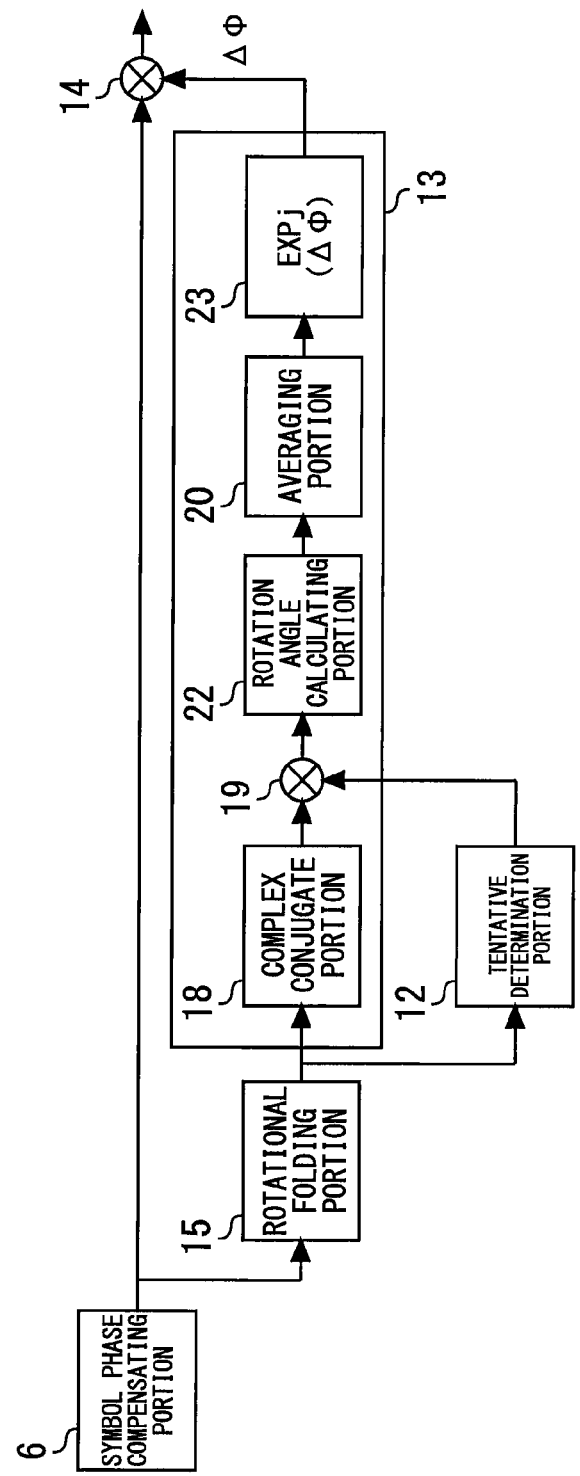
FIG. 8 is a diagram showing a phase compensation device according to a third embodiment of the present invention.

FIG. 8 is a diagram showing a phase compensation device according to a third embodiment of the present invention. A configuration until the multiplication portion 19 calculates a complex signal is similar to that of the second embodiment. A rotation angle calculating portion 22 calculates a rotation angle corresponding to a second phase difference ΔΦ from the complex signal. Then, after the averaging portion 20 determines an average for several symbols, an exponential function display portion 23 shows the rotation angle by an exponential function expression EXPj (ΔΦ).

The phase difference compensating portion 14 multiplies output signals of the symbol phase difference compensating portion 6 by the rotation angle expressed by the exponential function expression. Thereby, for the output signals on which remaining phase noise exists, phase fluctuation can be compensated.

A program for implementing the functions of the phase compensation device according to the first to third embodiment may be recorded in a computer-readable recording medium so that the program recorded in the recording medium is read in and executed by a computer system or a programmable logic device to perform phase compensation. The "computer system" described here may contain hardware such as OS, peripheral equipment, etc. The "computer system" may contain a WWW system having a homepage providing environment (or displaying environment). The "computer-readable recording medium" may be a portable medium such as a flexible disc, a magneto-optic disc, ROM and CD-ROM, or a storage device such as a hard disc incorporated in a computer system. Furthermore, the "computer-readable recording medium" may contain an element for holding a program for a constant time like a volatile memory (RAM) in a computer system serving as a server or a client when a program is transmitted through a network such as the Internet or a communication line such as a telephone line. The program may be transmitted from a computer system having a storage device or the like in which the program is stored, to another computer system via a transmission medium or by transmission waves in a transmission medium. Here, the "transmission medium" for transmitting the program is a medium having a function of transmitting information like a network (communication network) such as the Internet or a communication circuit (communication line) such as a telephone line or the like. The program may be provided to perform a part of the foregoing function. Furthermore, the program may be provided to perform the foregoing function in combination with a program which has been already stored in the computer system, so-called a differential file (differentia program).

REFERENCE SIGNS LIST 6 symbol phase difference compensating portion; 7 known pattern extracting portion; 8 reference signal storing portion; 9,13 phase difference acquiring portion; 10,14 phase difference compensating portion; 12 tentative determination portion; 15 rotational folding portion.

The invention claimed is:
1. A phase compensation device comprising:
a symbol phase difference compensating portion calculating a first phase difference which is a phase difference between a known pattern extracted from a received signal and a true value of the known pattern and performing phase compensation for the received signal based on the first phase difference;
a tentative determination portion tentatively determining an output signal of the symbol phase difference compensating portion to acquire an estimated value of a phase;
a first phase difference acquiring portion acquiring a second phase difference which is a phase difference between a phase of the output signal and the estimated value of the phase acquired by the tentative determination portion; and
a first phase difference compensating portion performing phase compensation for the output signal based on the second phase difference.

2. The phase compensation device according to claim 1, wherein the symbol phase difference compensating portion includes:
a known pattern extracting portion extracting the known pattern inserted in the received signal;
a reference signal storing portion storing the true value of known pattern as a reference signal;
a second phase difference acquiring portion acquiring the first phase difference which is a phase difference between the known pattern extracted by the known pattern extracting portion and the reference signal; and
a second phase difference compensating portion performing phase compensation for the received signal based on the first phase difference.

3. The phase compensation device according to claim 1, further comprising a rotational folding portion rotating and folding a signal existing in other quadrant into any one of the first to fourth quadrants on a constellation for the output signal of the symbol phase difference compensating portion,
wherein the tentative determination portion and the first phase difference acquiring portion perform processing for the output signal folded by the rotational folding portion.

4. The phase compensation device according to claim 1, wherein the tentative determination portion sets an estimated value of a phase for each of a plurality of threshold regions on a constellation, and determines an estimated value of a phase corresponding to a threshold region in which the output signal is included,
the plurality of threshold regions include a first threshold region and a second threshold region,
an amplitude of a signal to which the second threshold region corresponds is larger than an amplitude of a signal to which the first threshold region corresponds, and
the second threshold region extends in a phase rotation direction in comparison with the first threshold region.

5. The phase compensation device according to claim 1, wherein the first phase difference acquiring portion calculates a complex conjugate of the output signal, multiplies the complex conjugate by a signal outputted by the tentative determination portion to calculate an electric field information signal and acquires the second phase difference from the electric field information signal.

6. The phase compensation device according to claim 1, wherein the first phase difference acquiring portion calculates a complex conjugate of the output signal, multiplies the complex conjugate by a signal outputted by the tentative determination portion to calculate an electric field information signal, calculates a rotation angle from the electric field information signal and acquires the second phase difference from the rotation angle.

7. A communication apparatus comprising:
photoelectric conversion portion converting an optical signal to an analog electrical signal;

an AD conversion portion converting the analog electrical signal to the received signal which is a digital electrical signal; and the phase compensation device according to claim 1 performing phase compensation for the received signal.

8. A phase compensation method performed by a phase compensation device comprising:

calculating a first phase difference between a known pattern extracted from a received signal and a true value of the known pattern and performing phase compensation for the received signal based on the first phase difference to acquire an output signal;

tentatively determining the output signal to acquire an estimated value of a phase;

acquiring a second phase difference between a phase of the output signal and the estimated value of the phase; and performing phase compensation for the output signal based on the second phase difference.

\* \* \* \* \*